July 14, 1970 L. L. DURR ET AL 3,520,417
PLEATED PAPER FILTER AND METHOD OF MAKING SAME
Original Filed Oct. 23, 1965 2 Sheets-Sheet 1
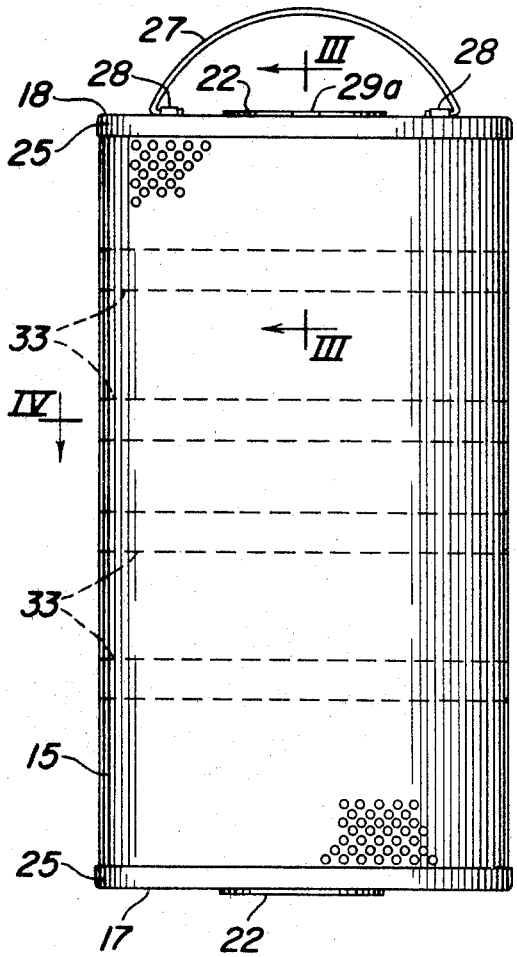
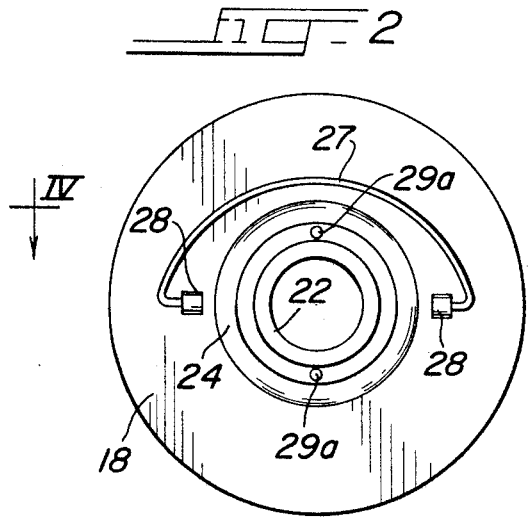
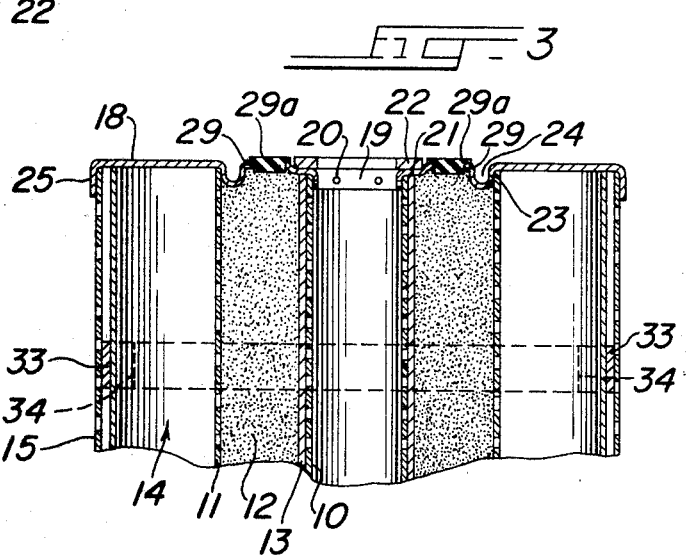
INVENTORS
LARRY L. DURR
EDWARD D. FULTON

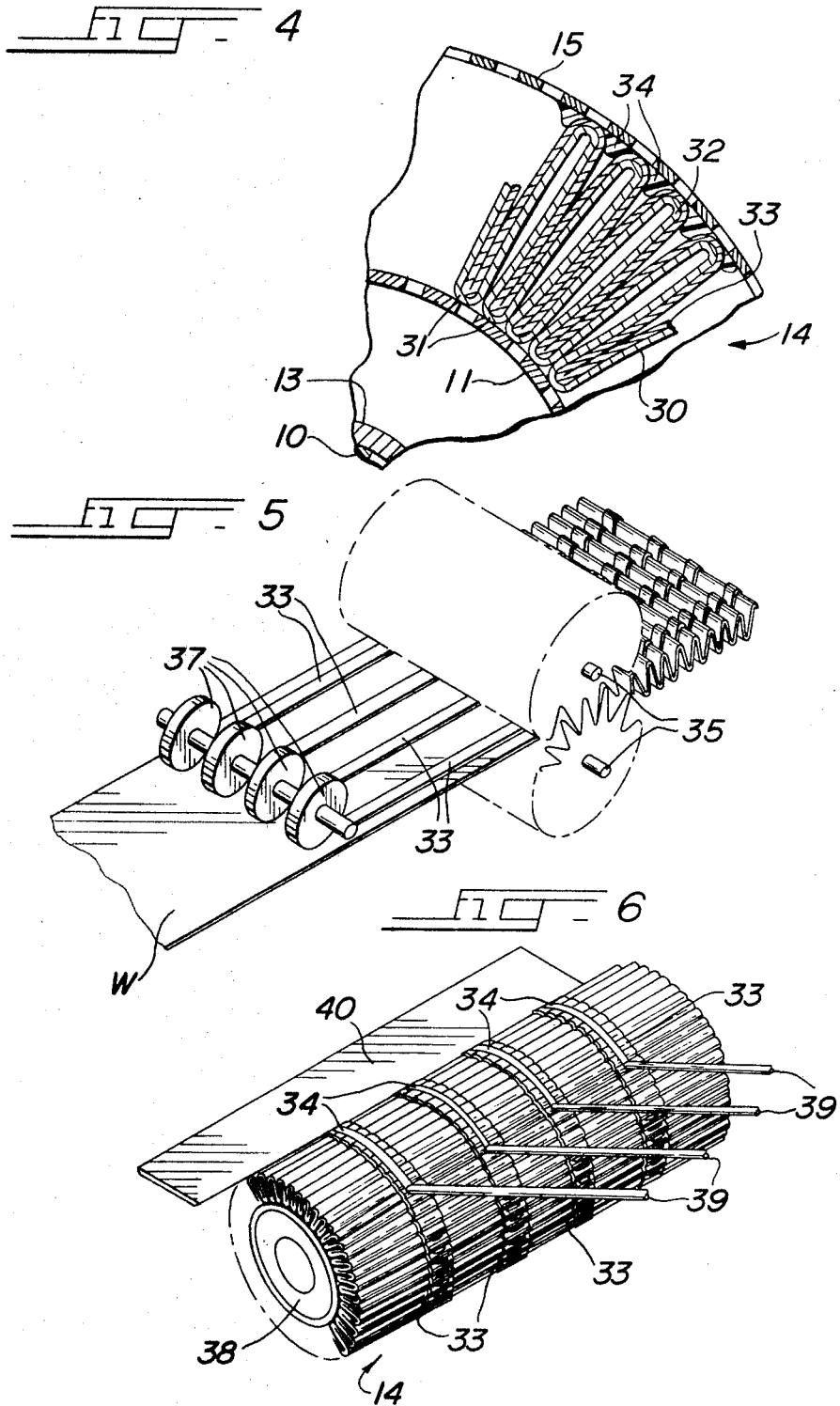

United States Patent Office 3,520,417
Patented July 14, 1970

3,520,417
PLEATED PAPER FILTER AND METHOD OF MAKING SAME
Larry L. Durr and Edward D. Fulton, Lebanon, Ind., assignors, by mesne assignments, to The Carborundum Company, Niagara Falls, N.Y., a corporation of Delaware
Continuation of application Ser. No. 503,188, Oct. 23, 1965. This application July 2, 1969, Ser. No. 845,614
Int. Cl. B01d 27/06
U.S. Cl. 210—493                     3 Claims

ABSTRACT OF THE DISCLOSURE

A filter cartridge comprising an outer preforated cylindrical housing and end caps, an inner concentric perforated outlet tube forming an annular chamber containing an annular axially pleated filter element, the pleats or folds of said filter element on their outer faces being maintained in spaced apart relationship by a plurality of axially separated narrow paper strips frictionally interpleated with the pleated filter paper but adhesively unattached to the filter element, and having wedges of plastisol applied to the spacer strips and doctored down between the pleats so as to be clear of the radially outer tips of the pleated material.

---

This application is a streamlined continuation of our U.S. patent application Ser. No. 503,188 filed Oct. 23, 1965, and now abandoned.

This invention relates to improvements in filters of the type which are adapted for use in dry cleaning solvent recovery systems and various industrial and other uses in which a pleated paper filter is desirable and useful, and more particularly concerns a disposable cartridge filter construction.

One of the major problems in respect to pleated paper filters which are used under conditions of substantial liquid pressures is that of preventing collapsing of the pleats onto one another in the presence of high pressures so that substantial filtration surface is lost and thus the efficiency of the filter substantially reduced from that which may be expected on the basis of total filter area. One way that has been proposed to solve this problem has been to adhesively secure a band or a plurality of bands of paper in contact with the outer diameter peaks or edges of the pleats, but under strong pressures the pleats break away from said bands. Another way has been to apply gobs of plastisol directly to the pleats between the outer diameter edges, but this severely reduces the filtration area of the pleated filter.

An important object of the present invention is to provide a new and improved pleated paper filter construction and a method of making the same according to which the foregoing and other difficulties and problems are overcome and a substantially improved pleated paper filter is obtained.

Another object of the invention is to provide a new and improved pleated paper filter in which the pleats are effectively maintained separated even under high fluid pressures while the effective filtering area remains substantially unimpaired.

A further object of the invention is to provide new and improved means for maintaining the pleats of a pleated filter paper element separated.

Still another object of the invention is to provide new and improved means assembled with a pleated paper filter element for maintaining the pleats in substantially uniformly spaced relation.

Yet another object of the invention is to provide a substantially improved, low cost, throwaway pleated paper filter element.

A still further object of the invention is to provide improvements in low cost throwaway filter assemblies of the type which are especially suitable for use in dry cleaning fluid recovery or reconditioning systems.

A yet further object of the invention is to provide a new and improved method of making pleated paper filter elements with self-contained novel pleat separating means.

Other objects, features and advantages of the present invention will be readily apparent from the following detailed description of a preferred embodiment thereof, taken in conjunction with the accompanying drawings, in which:

FIG. 1 is a side elevational view of a representative filter assembly embodying features of the invention;

FIG. 2 is a top plan view thereof;

FIG. 3 is a fragmentary vertical sectional detail view taken substantially on the line III—III of FIG. 1;

FIG. 4 is a transverse sectional detail view taken substantially on line IV—IV of FIG. 1;

FIG. 5 is a schematic view illustrating a step in the manufacture of the improved pleated paper filter element of the present invention; and FIG. 6 is a schematic view illustrating a further step in the method of making the filter element.

On reference to FIGS. 1–4, the illustrated filter assembly is of a type which is especially suitable for use in the reconditioning of dry cleaning solvents, but may be used for other industrial and like purposes where a low cost, throwaway type of filter employing a pleated paper filter element is desirable. To this end, the filter assembly comprises an elongated concentric tubular arrangement of elements adapted for inward flow of liquid uniformly about its cylindrical outer perimeter, with the effluent gathering at the center and flowing from either or both ends of the unit, and comprising a center uniformly perforated rigid and preferably metal tube 10 concentric with an intermediate uniformly perforated coextensive larger diameter rigid preferably metal spacer tube 11 and defining therewith an elongated annular chamber filled with suitable conditioning material such as granular activated charcoal 12, a thin felt tubular sock 13 being engaged about the center tube 10 to prevent escape of the carbon particles. About the intermediate tube 11 is mounted a tubular coextensive pleated paper filter element 14 and about the outer perimeter thereof is placed a protective uniformly perforated heavy paper outer tube 15, although, this tube may be omitted if desired and especially for cost reduction purposes.

Maintaining the tubular components of the filter assembly unit concentric and substantially coextensive are respective substantially identical bottom and top end caps 17 and 18, respectively, comprising one-piece sheet metal stampings. Each of the end caps has a central opening for alignment with the associated end of the center tube 10 and defined by a narrow inwardly extending tubular centering flange 19 telescopically engaged within the end of the center tube 13 and secured thereto, as by means of spot welding 20. Adjacent to the flange 19 is an annular inset seat 21 in which is engaged an annular disc gasket 22 such as cork. Concentric retention of the intermediate tube 11 is by means of an annular axially extending centering flange 23 defined by an indentation 24 in the end cap, with an annular area of substantial width between the indentation and the centering flange. About the outer margin of the pleated filter element 14 and the outer cover tube 15, if employed, is an axially extending annular retaining flange 25. For convenience in carrying the filter unit, a bail 27 is attached to the top end cap 18 by opposed journal ends thereon engaging in integral struckup bail hinge straps 28. In addition, the top end cap 18 is provided with a pair of holes 29 in the annular area between the flange 19 and the indentation 24, and aligned with the chamber between the tubes 10 and 11 through which the activated carbon 12 is introduced after the tubular assembly has been completed, such openings being then closed by suitable respective plugs 29a.

Assembly of the tubular components of the filter unit is easily and rapidly effected in mass production, as by assembling all of the tubular components with the bottom end cover plate 17, then assembling the top cover plate 18 and welding the cover flanges 19 to the center tube 10. The carbon 12 is then filled through the filler openings 29 and the plugs 29a applied and the unit is ready for service. The bail 27 will have been preassembled with the top end cap 18, or it may be assembled with the unit after other assembling has been completed. The same remarks apply to the gasket 22.

Basically, the pleated paper filter element 14 is of conventional construction comprising filter paper uniformly folded to provide pleat walls 30 joined on inner folds 31 and outer folds 32. The inner folds 31 define thereacross of an inner perimeter for the tubular pleated filter element opposing the intermediate tube 11 while the outer folds 32 define the outer perimeter of the element and oppose the paper outer tube 15 within the chamber defined between the tubes.

In order to maintain the pleats of the element 14 spaced from one another at the outer side, namely, in respect to the faces of the pleat panels or walls 30 which oppose the inward pressure of the infiltrating liquid, narrow spacer strips 33 are interpleated with the filter pleats, being intimately frictionally engaged with the outer faces of the pleat panels 30, within the folds 31 and over the folds 32. Advantageously, the pleats of these strips 33 are held to the primary filter pleats by their frictional interengagement and without any need for adhesive or other attachment so that during filtering operations the areas of the filter panels 30 under the strips 33 are accessible to the liquid by the separating pressure of the liquid. As the areas of the panels 30 not covered by the strips 33 become coated with solid material filtered from the liquid, the fluid pressure tends to find the areas of the pleat panels behind the strips as the path of least resistance to filtration. The opposed interpleated lengths of each of the strips 33 effectively maintain the primary pleats sepawardly from the folds 32, throughout the life of the filter. Desirably the separator or spacer strips 33 may be made from filter paper, although other paper may be used. As many of the spacer strips 33 may be employed longitudinally along the length of the filter element 14 as desired, in a typical construction where the filter element may be on the order of 14 or 15 inches long and 7 or 8 inches in outside diameter, the strips 33 on the order of ¾" wide may be located at about 3" intervals along the length of the element.

For additional assurance against tendency toward forcing of the outer folds 32 of the pleats together under pressure surges in service, spacer means 34 are desirably applied between the adjacent outer folds of the respective strips 33. In a convenient form, said spacer means comprise plastisol wedges applied in a fluid state and hardened in place in adhering relation to the paper strips 33 but free from engagement with the primary pleats of the filter element. Thereby the respective paper strips 33 carry the spacer wedges 34 and are interposed between such wedges and the primary filter pleats, so that there is no interference with full filtering efficiency since the material of the spacer wedges 34 does not contact and block any of the filtering surfaces of the primary filter pleats. In order to maintain the outside perimeter diameter of the unit to a minimum, the wedges 34 are desirably located within the circumference described about the tips of the outer folds of the spacer strips 33.

In making the filter element 14, a web of filter paper W (FIG. 5) is fed to pleating rolls 35 which progressively form the pleats across the web. In this same operation, the paper strips 33 are fed from suitable supply rolls 37 onto the face of the web W which provide the outer faces of the primary filter pleats and into the pleating rolls 35 so as to be simultaneously interpleated with the filter paper pleats as such pleats are formed. The pleating pressure thus applied has been found sufficient to effect adequate frictional interengagement between the interpleated strips 33 and the pleated web to enable further handling of the pleated web and the subsequent tubular filter element without displacement of the interpleated spacer strips.

After pleating has been completed, suitable strip lengths of the pleated web and interpleated tape-like spacer strips are cut off and rolled about a sizing mandrel 38 (FIG. 6) and the ends suitably joined as is customary. Then, by means of suitable nozzles 39 plastisol in fluid condition is applied to the between-crest spaces of the spacer strips 33 as the filter element 14 is rotated by the mandrel 38. While the plastisol is still soft, immediately after having been applied, it is doctored by means of a doctor blade 40 into wedge-forming position and substantially clear of the exposed crests of the spacer strip pleats so as to provide a smooth perimeter which will avoid interference with axial relative assembly of the cover tube 15 fairly snugly about the completed filter element 14.

It will be understood that modifications and variations may be effected without departing from the scope of the novel concepts of the present invention.

We claim:

1. A method of making a pleated paper filter element comprising: feeding a filter paper web to a pleater; feeding spacer strips to said web at spaced intervals across its width; simultaneously pleating the web and interpleating said strips with the pleats formed in the web; cutting off a section of the pleated web; mounting said section on a mandrel with said interpleated strips on the outer side of the tubular element formed on the mandrel; securing the ends of the section together; and applying plastisol to said strips without applying any of the plastisol to the pleats of the filter element, said plastisol being applied in the fluid state, and while the plastisol is still in a fluid state after application doctoring the same substantially clear of the peaks of the pleated paper strip exposed at the perimeter of the filter element.

2. A filter construction of the character described including: a plurality of concentrically related tubes and end caps securing the tubes and defining a cylindrical filter element chamber; a pleated filter paper tubular filter element in said chamber and having inner pleat folds opposing the inner tube defining said chamber and outer pleat folds opposing the outer tube definning said chamber: spacer strips interpleated with the outer faces of the pleats of the filter element in simple frictional engagement therewith and free from any other attachment throughout at last the major opposing areas of the strips and the pleats of the filter element and providing crests which oppose the outer of the tubes defining said chamber; and spacer wedges carried on said spacer strips between said outer crest thereof and free from said filter element pleats, said wedges being located substantially entirely within a perimeter across said crests of said strips so that said crests closely confront said outer tube and said strips serve as spacers between said outer folds of said element and said outer tube.

3. A paper filter element having a succession of relatively deep pleats including: a plurality of longitudinally spaced interpleated spacer strips held thereto frictionally and separably so that liquid pressure during filtration can penetrate the areas of the filter element pleats under said strips; and spacer wedges of plastisol carried by said paper strips between the pleats thereof and free from said filter element pleats, in which said plastisol wedges are located substantially entirely within a perimeter across the peaks of the pleats of said strips.

References Cited

UNITED STATES PATENTS 3,178,025  4/1965  Brucken et al. _____ 210—315 X
3,189,179  6/1965  McMichael _____ 210—315 X
3,310,177  3/1967  Briggs et al. _____ 210—493 X SAMIH N. ZAHARNA, Primary Examiner U.S. Cl. X.R.

210—266, 282

Disclaimer 3,520,417.—*Larry L. Durr* and *Edward D. Fulton*, Lebanon, Ind. PLEATED PAPER FILTER AND METHOD OF MAKING SAME. Patent dated July 14, 1970. Disclaimer filed Apr. 18, 1975, by the assignee, *The Carborundum Company*.

Hereby disclaims the entire remaining term of said patent.

[*Official Gazette June 24, 1975.*]